United States Patent
Evans et al.

(10) Patent No.: US 7,264,761 B2
(45) Date of Patent: Sep. 4, 2007

(54) METHOD OF MAKING A MOLDED PLASTIC ELBOW

(75) Inventors: David V. Evans, Fountain Valley, CA (US); Mark M. Ensworth, Orange, CA (US)

(73) Assignee: Rain Bird Corporation, Azusa, CA (US)

( * ) Notice: Subject to any disclaimer, the term of this patent is extended or adjusted under 35 U.S.C. 154(b) by 336 days.

(21) Appl. No.: 11/061,412

(22) Filed: Feb. 18, 2005

(65) Prior Publication Data

US 2005/0140060 A1 Jun. 30, 2005

Related U.S. Application Data

(62) Division of application No. 10/128,327, filed on Apr. 23, 2002, now Pat. No. 7,153,125, which is a division of application No. 09/487,153, filed on Jan. 19, 2000, now abandoned.

(51) Int. Cl.
  *B29C 45/44* (2006.01)
(52) U.S. Cl. ............... 264/328.1; 264/334; 425/577; 425/DIG. 58; 249/64
(58) Field of Classification Search ............ 264/328.1, 264/318, 334; 425/577, 409, 439, 441, 393, 425/392, DIG. 58; 249/184, 145, 64, 180
See application file for complete search history.

(56) References Cited

U.S. PATENT DOCUMENTS

| | | | | |
|---|---|---|---|---|
| 143,327 A | * | 9/1873 | Butler | 249/145 |
| 1,347,575 A | * | 7/1920 | Bungay | 249/186 |
| 3,095,613 A | * | 7/1963 | Ravn et al. | 249/145 |
| 3,545,718 A | * | 12/1970 | Shale | 249/185 |
| 3,632,277 A | * | 1/1972 | Stalter | 425/438 |
| 4,184,834 A | * | 1/1980 | Barber | 425/548 |
| 4,541,605 A | * | 9/1985 | Kubota et al. | 249/142 |
| 5,804,268 A | | 9/1998 | Mukawa | |
| 5,887,796 A | | 3/1999 | Dimmer | |
| 6,082,992 A | * | 7/2000 | Mitteregger et al. | 425/556 |
| 6,399,006 B1 | * | 6/2002 | Stoick et al. | 264/328.1 |
| 7,160,497 B2 | * | 1/2007 | Krantz et al. | 264/328.11 |

* cited by examiner

*Primary Examiner*—Jill L. Heitbrink
(74) *Attorney, Agent, or Firm*—Fitch, Even, Tabin & Flannery

(57) ABSTRACT

An improved molded plastic elbow and a related mold assembly and manufacturing method are provided, wherein the elbow defines an internal flow path having a smoothly radiused inside turn. The elbow is formed by injecting plastic material into a tubular mold cavity formed by closed mold members in cooperation with a pair of slidably retractable core units of circular cross section and having distal ends in mating, angularly set end-to-end contact to form the internal flow path having a turn formed along the length thereof. Each core unit comprises an outer core pin to form an outer portion of the flow path and including a ramped track for slide-fit mounting of an inner slide segment which forms an inner portion of the flow path and further includes a curved inside edge to form a portion of the smoothly radiused inside turn. Initial retraction of each outer core pin from the mold cavity permits relative advancement of the inner slide segment along the ramped track toward a centerline of the flow path, sufficiently for the curved inside edge of the inner slide segment to clear the radiused inside turn of the molded elbow and thereby enable interference-free linear withdrawal of the core unit from the molded plastic part.

1 Claim, 5 Drawing Sheets

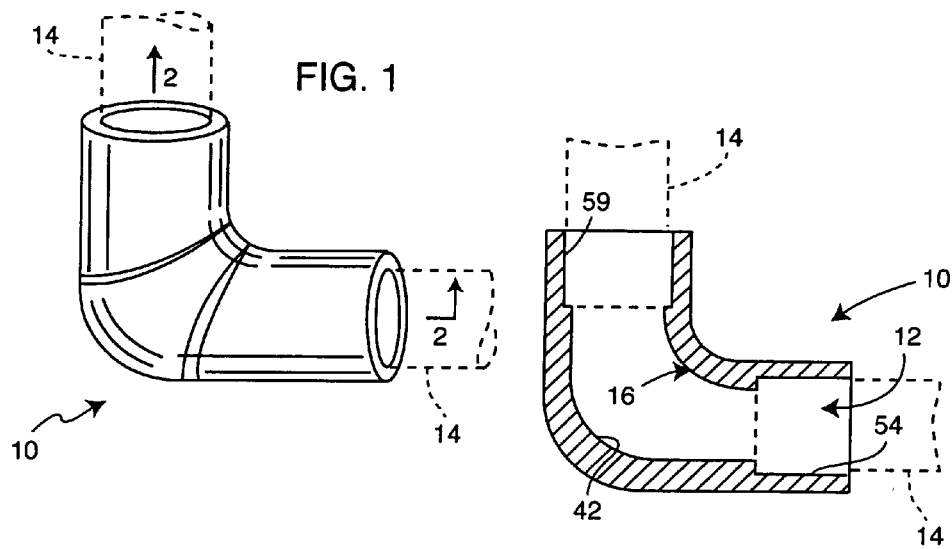
FIG. 1
FIG. 2
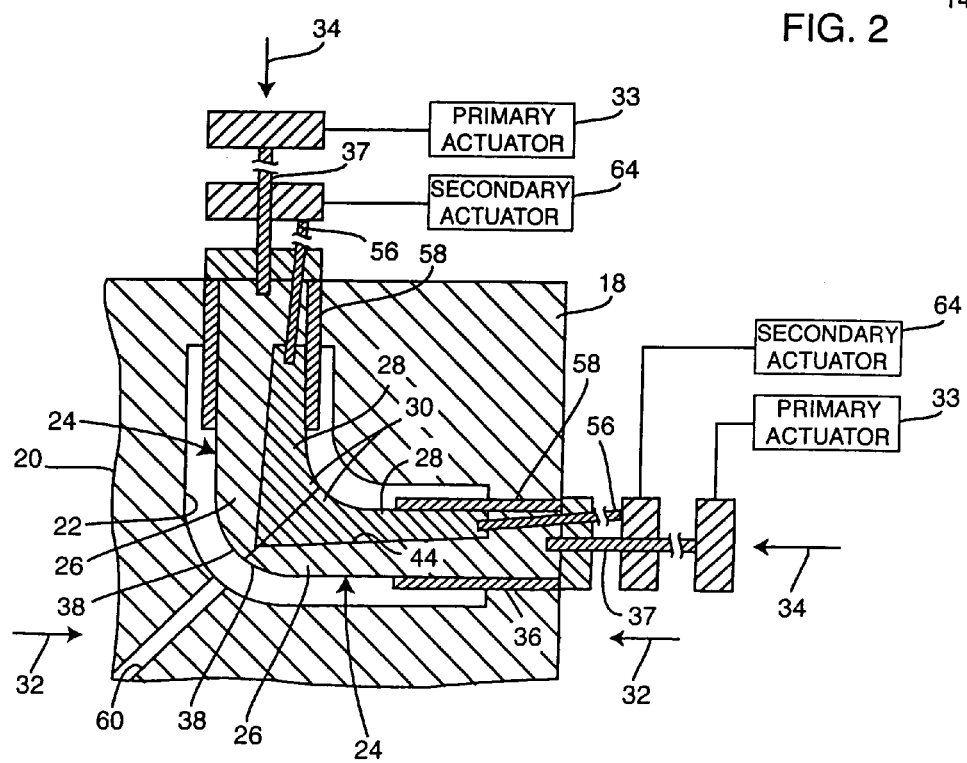
FIG. 3

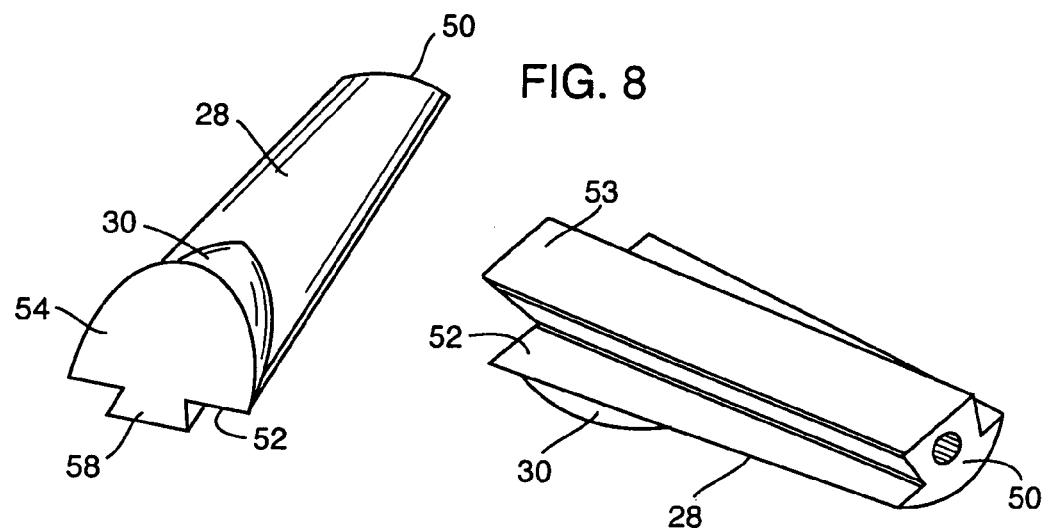
FIG. 8
FIG. 9
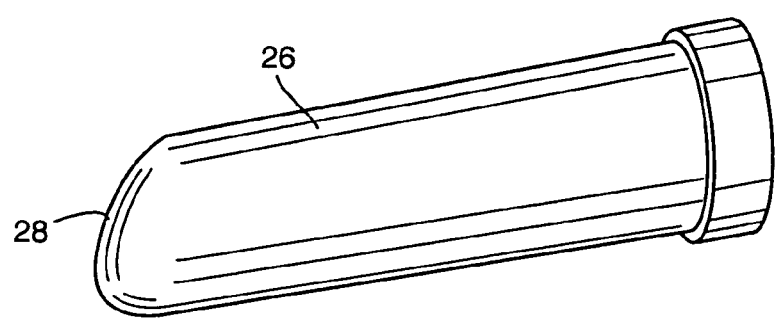
FIG. 10
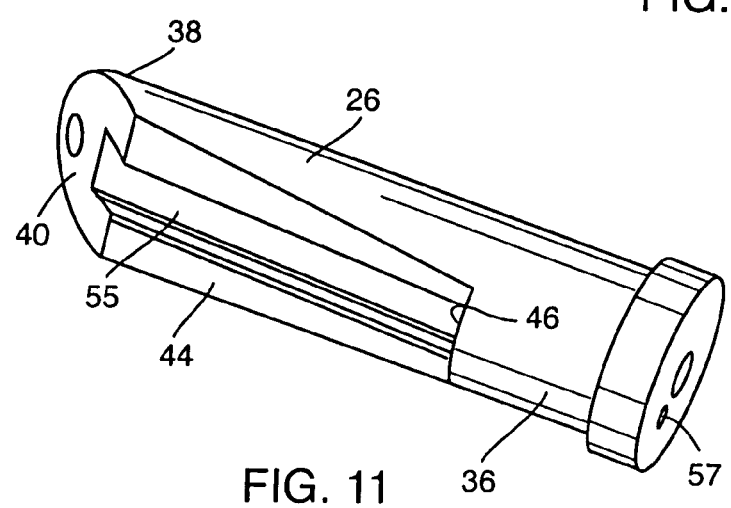
FIG. 11

METHOD OF MAKING A MOLDED PLASTIC ELBOW

This is a division of U.S. patent application Ser. No. 10/128,327, filed Apr. 23, 2002, now U.S. Pat. No. 7,153, 125 titled "Molded Plastic Elbow," which is a division of U.S. patent application Ser. No. 09/487,153, filed Jan 19, 2000 now abandoned, titled "Molded Plastic Elbow," which are hereby incorporated by reference in their entirety.

BACKGROUND OF THE INVENTION

This invention relates generally to improvements in molded plastic pipe components of the type typically found in irrigation sprinkler systems and the like. More specifically, this invention relates to an improved molded plastic elbow and to a related mold assembly and method for producing the elbow with an internal flow path defining a turn, wherein the inside edge of the turn is smoothly radiused for reduced hydraulic pressure loss and to provide the elbow with improved fatigue resistance.

Plastic pipe and related molded plastic pipe fittings are well known in the art for use in a variety of relatively low to mid-range fluid pressure applications, particularly such as in irrigation sprinkler systems to deliver irrigation water under pressure to sprinkler devices having appropriate spray nozzles or the like to distribute the water over a prescribed terrain area. In this regard, molded plastic pipe fittings such as elbow fittings and the like are used for interconnecting lengths of pipe at an angle, whereby such elbow fittings define an internal flow path extending through a turn, typically a 90° turn. In one common form used primarily to interconnect elongated pipe sections in an irrigation supply network, the elbow fitting is adapted for slip-fit adhesive connection to elongated pipe sections. In another common form, the elbow fitting may include one or more threaded segments to form a so-called swing joint or coupling for quick and easy threaded connection to adjacent pipe sections such as a riser pipe having a sprinkler device mounted at an upper end thereof.

In the past, molded plastic elbow fittings have been formed by injection molding processes wherein plastic material is injected under heat and pressure into a mold cavity defined by closed mold members. A pair of retractable core units are typically mounted to extend into the mold cavity in an angularly intersecting relation for cooperatively defining the internal flow path through the injection molded fitting, wherein these core units are adapted for sliding linear retraction from the molded part when the mold members are opened to release the molded part. Unfortunately, this standard molding apparatus and related process has necessarily limited the inside edge geometry of the internal flow path to a relatively sharp corner in order to permit interference-free linear retraction of the sliding core units from the molded part. This sharp-cornered geometry undesirably contributes to substantial hydraulic pressure loss as water flows through the elbow fitting. As a result, especially in an irrigation network including a substantial number of such elbow fittings, the cumulative pressure loss attributable to the elbow fittings can adversely restrict the terrain area which can be effectively irrigated. Moreover, the relatively sharp inside edge geometry represents a stress concentration site which is susceptible to fatigue cracking in response to on-off pressure cycling over a period of time.

Similarly, hydraulic pressure losses and fatigue problems have been noted in other molded plastic elbow-type fluid conduits, such as, for example, in the inlet and outlet portions of molded plastic valve bodies such as typical anti-syphon and pressure and flow regulating irrigation control valves. In these instances, the valve bodies are typically molded with elbow-shaped inlet and outlet conduit sections for slip-fit adhesive or threaded connections to elongated supply pipes, and like the elbow fittings just discussed, the elbow sections function to direct the incoming and outlet fluid flows through turns of typically 90° within the valve body.

There exists, therefore, a significant need for an improved molded plastic elbow and a related mold assembly and production method, wherein the elbow has an internal flow path defining a turn with a smoothly curved or smoothly radiused inside edge geometry, for reduced hydraulic pressure loss and improved fatigue resistance. The present invention fulfills these needs and provides further related advantages.

SUMMARY OF THE INVENTION

In accordance with the invention, an improved molded plastic elbow and related mold assembly and production method are provided, wherein the elbow has an internal flow path defining a turn with a smoothly radiused inside surface. The elbow is formed by injecting plastic material into a mold cavity formed by closed mold members in cooperation with a pair of slidably retractable core units having distal ends in mating and angularly set end-to-end engagement to form the internal flow path. Each core unit comprises an outer core pin slidably supporting an inner slide segment on a ramped track, wherein the inner slide segment defines a curved inside edge to form a portion of the smoothly radiused inside turn in the molded part. Initial retraction of the outer core pin of each core unit from the mold cavity permits relative displacement of the associated inner slide segment along the ramped track in a direction toward a centerline of the flow path, sufficiently to clear the radiused inside turn in the molded part and thereby permit interference-free linear sliding retraction of the core unit from the molded plastic part.

The retractable core units cooperatively form the internal flow path to have a generally circular cross sectional shape with a smoothly curved outside turn and additionally including the smoothly radiused inside turn. The outer core pins of the pair two core units include contoured nose or distal ends each shaped to define a portion of the smoothly curved outside turn, and further include planar abutment faces set at an angle for flush end-to-end engagement upon full advancement of the two core units into the mold cavity. From its distal end, each outer core pin extends longitudinally with a part circular cross sectional shape to form an outer portion of the flow path. Importantly, an inner surface of each part circular core pin defines the ramped track extending on an angle longitudinally rearwardly and inwardly from the distal end to a radially extending stop surface formed generally at an associated end of the mold cavity.

The inner slide segment for each core unit has a part circular cross sectional shape and includes a ramped outer slide surface keyed for longitudinal sliding movement on the ramped track of the associated outer core pin. Actuator means are provided for controlling and limiting displacement of the inner slide segment along the ramped track between a retracted position nested on the outer core pin and cooperating therewith to define an inner portion of the internal flow path, and an advanced position protruding longitudinally beyond the distal end of the outer core pin.

The distal ends of the inner slide segments also include planar abutment faces set at an angle for flush end-to-end engagement, substantially coplanar with the distal end abutment faces of the outer core pins upon full advancement of the two core units into the mold cavity. The inner slide segments additionally include the curved inside edges disposed generally at the distal ends thereof for cooperatively forming the smoothly radiused inner turn.

When the outer core pin of each core unit is retracted from the mold cavity, following injection forming of the molded elbow therein, the actuator means associated with each inner slide segment accommodates advancing or forward relative displacement of the inner slide segment along the ramped track. Such advancing displacement is accompanied by an outward shift in the position of the inner slide segment in a direction toward the centerline of the flow path in the molded part. This outward shift by the inner slide segment carries the curved inside edge thereof to a position spaced slightly from the curved inside turn of the flow path formed in the molded part, so that the entire core unit can be longitudinally and linearly retracted from the molded part without interference.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of a molded plastic elbow, herein a plastic elbow fitting, constructed in accordance with the invention;

FIG. 2 is a vertical sectional view taken generally on the line 2-2 of FIG. 1;

FIG. 3 is a fragmented and somewhat schematic vertical sectional view of a mold assembly, illustrating closed mold members cooperating with a pair of retractable core units to define a mold cavity for injection molding of the elbow fitting of FIGS. 1 and 2;

FIG. 8 is a perspective view illustrating the distal end and an upper or radially inner side of one of the inner slide segments shown in FIG. 7;

FIG. 9 is a perspective view showing the proximal end and a lower or radially outer side of the inner slide segment of FIG. 8;

FIG. 10 is a perspective view depicting the distal end and a lower or radially outer side of one of the core pins shown in FIG. 7; and FIG. 11 is a perspective view showing the proximal end and an upper or radially inner side of the core pin of FIG. 10.

DETAILED DESCRIPTION OF THE PREFERRED EMBODIMENTS

Figure 4:
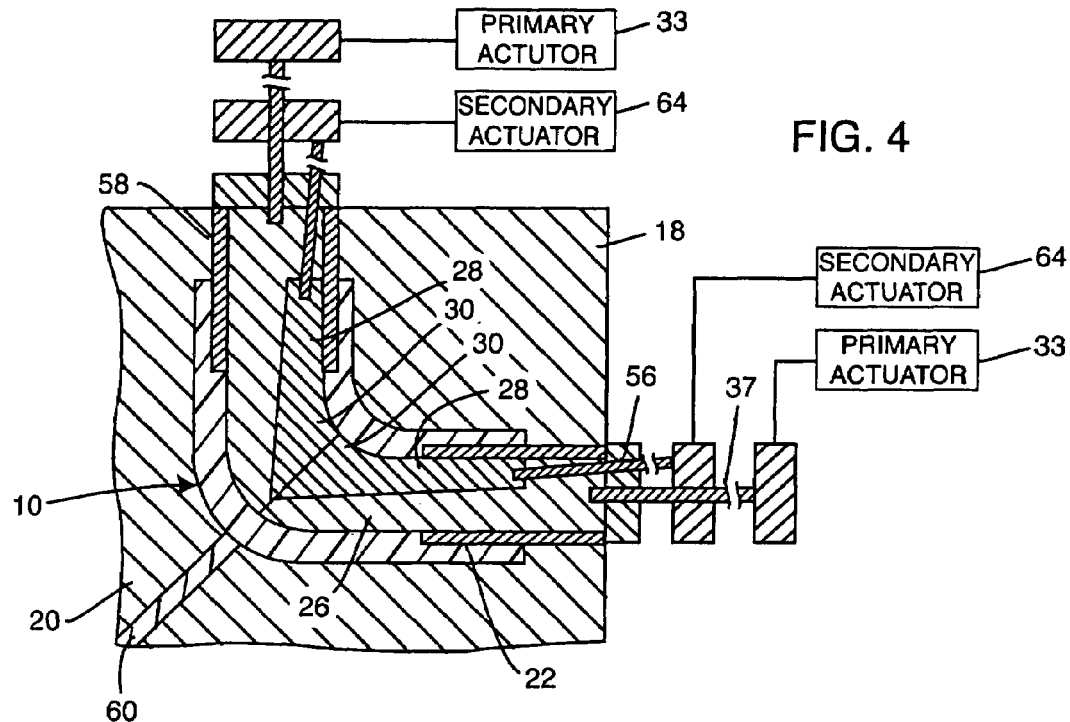
FIG. 4 is a fragmented sectional view of the mold assembly similar to FIG. 3, but showing the elbow fitting formed within the mold cavity.

As shown in the exemplary drawings, the present invention relates to an improved molded plastic elbow, in this instance a new and improved molded plastic elbow fitting referred to generally in the accompanying drawings by the reference numeral 10, and a related molding assembly and method for producing the improved elbow and fitting. As shown in FIGS. 1 and 2, the elbow fitting 10 comprises a unitary or one-piece tubular element formed from molded plastic to define an internal flow path 12 (FIG. 2) having a turn formed along the length thereof. The elbow fitting 10 comprises a plumbing connector for coupling fluid flow such as water or the like between a pair of pipes 14 (shown in dotted lines in FIGS. 1 and 2)

The improved elbow fitting 10 of the present invention is particularly designed to form the internal flow path 12 with a smoothly radiused inside turn, as identified by reference numeral 16 in FIG. 2. In this regard, molded plastic elbow fittings of this general type are commonly used in relatively low to mid-range fluid pressure applications, particularly such as irrigation sprinkler systems to deliver irrigation water under pressure to sprinkler devices which distribute the water over a prescribed terrain area. Molded plastic pipe fittings such as the illustrative elbow fitting 10 and the like are used for interconnecting lengths of pipe 14 at an angle, whereby such elbow fittings define the internal flow path 12 extending through a turn, typically a 90° turn as shown in FIG. 2. However, according to prior injection molding techniques, the internal flow path through the elbow fitting has been formed by linearly advancing and retracting an intersecting pair of sliding cores into a mold cavity, resulting in forming the flow path with a relatively sharp edge or corner at the inside turn. The sharp-cornered inside turn geometry results in a substantial hydraulic pressure loss during normal use, and additionally represents a stress concentration site susceptible to fatigue cracking and failure. The improved elbow fitting 10 of the present invention, including the smoothly radiused inside turn 16, overcomes these problems and disadvantages.

FIGS. 3-11 illustrate the improved molding assembly and method of the present invention for making the improved elbow fitting 10. In general, a pair of mold members 18 and 20 designed for use in a standard injection molding machine (not shown) are movable to a closed position defining a mold cavity 22 (FIG. 3) having a size and shape conforming to the exterior geometry of the elbow fitting 10 to be molded. A pair of slidably retractable core units 24 are advancible into the mold cavity 22 to define the geometry of the internal flow path 12 to be molded into the elbow fitting. Importantly, each sliding unit 24 comprises an outer core pin 26 shaped to form an outer portion of the flow path 12, and an inner slide segment 28 shaped to form an inner portion of the flow path 12. Each inner slide segment 28 includes a curved inside edge or trigger-shaped portion 30 formed generally adjacent a distal end thereof, to extend or wrap partially around the smoothly radiused inside turn to be formed in the molded part. The inner slide segment 28 is adapted for sliding displacement on the outer core pin 26, upon retraction of the core unit 24 from the molded part, to permit an outward shift in the position of the curved inside edge 30 sufficiently to accommodate interference-free withdrawal of the entire sliding core unit 24 from the molded part.

More specifically, FIG. 3 illustrates the pair of mold members 18, 20 advanced in the direction of arrows 32 toward a normally closed position defining the elbow shaped mold cavity 22. As shown, the two core units 24 are adapted for advancement by means of suitable primary actuators 33 in the direction of arrows 34 to protrude from different directions into the mold cavity 22, with distal ends of the two core units 24 set angularly for end-to-end abutting contact generally at a mid point of the turn to be molded along the flow path 12 of the elbow fitting. In this regard, the illustrative drawings show the distal ends of the sliding core units 24 set at an angle of about 45°, to form an approximate 90° turn along the flow path. It will be recognized and understood, however, that alternative elbow fitting configurations having flow path turns of different angular magnitudes may be formed according to the invention.

Figure 5:
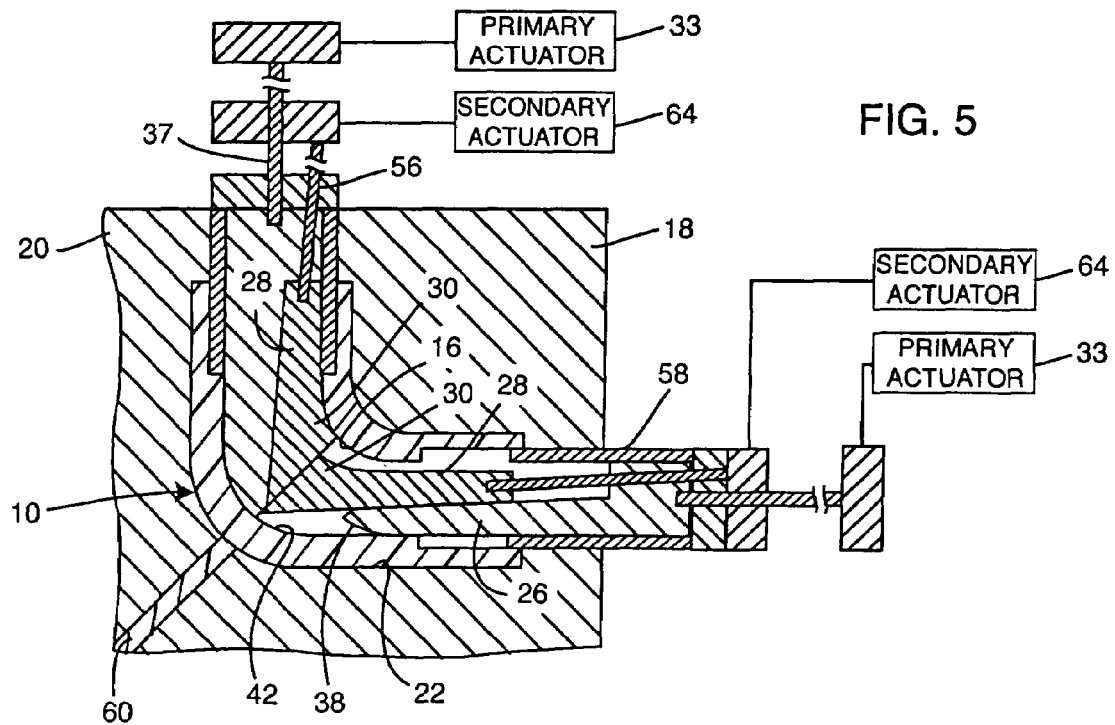
FIG. 5 is a fragmented sectional view of the mold assembly similar to FIG. 4, and showing initial retraction of one of the core units from the mold assembly.
Figure 6:
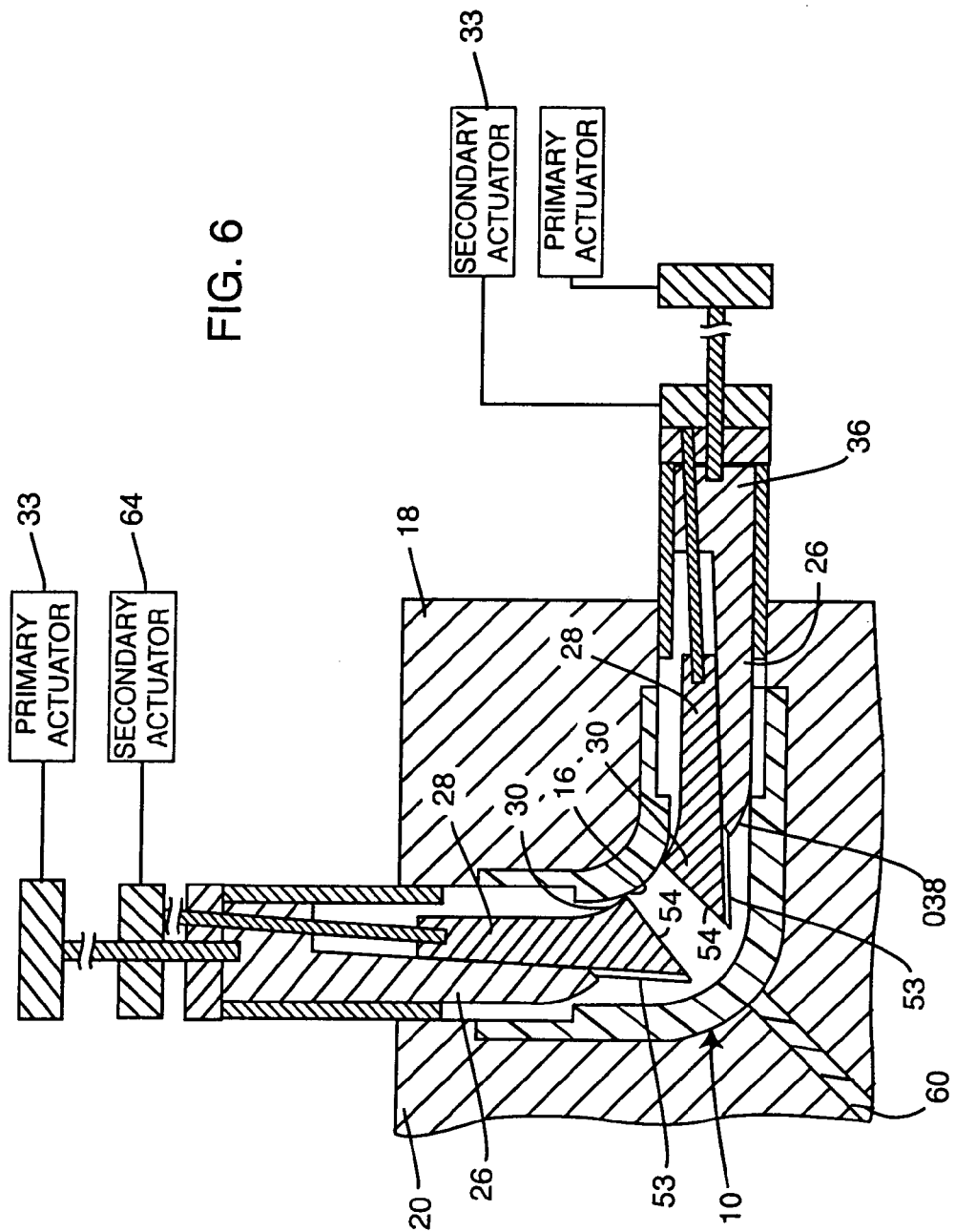
FIG. 6 is a fragmented sectional view of the mold assembly similar to FIG. 5, and illustrating retraction of both of the core units from the mold assembly.
Figure 7:
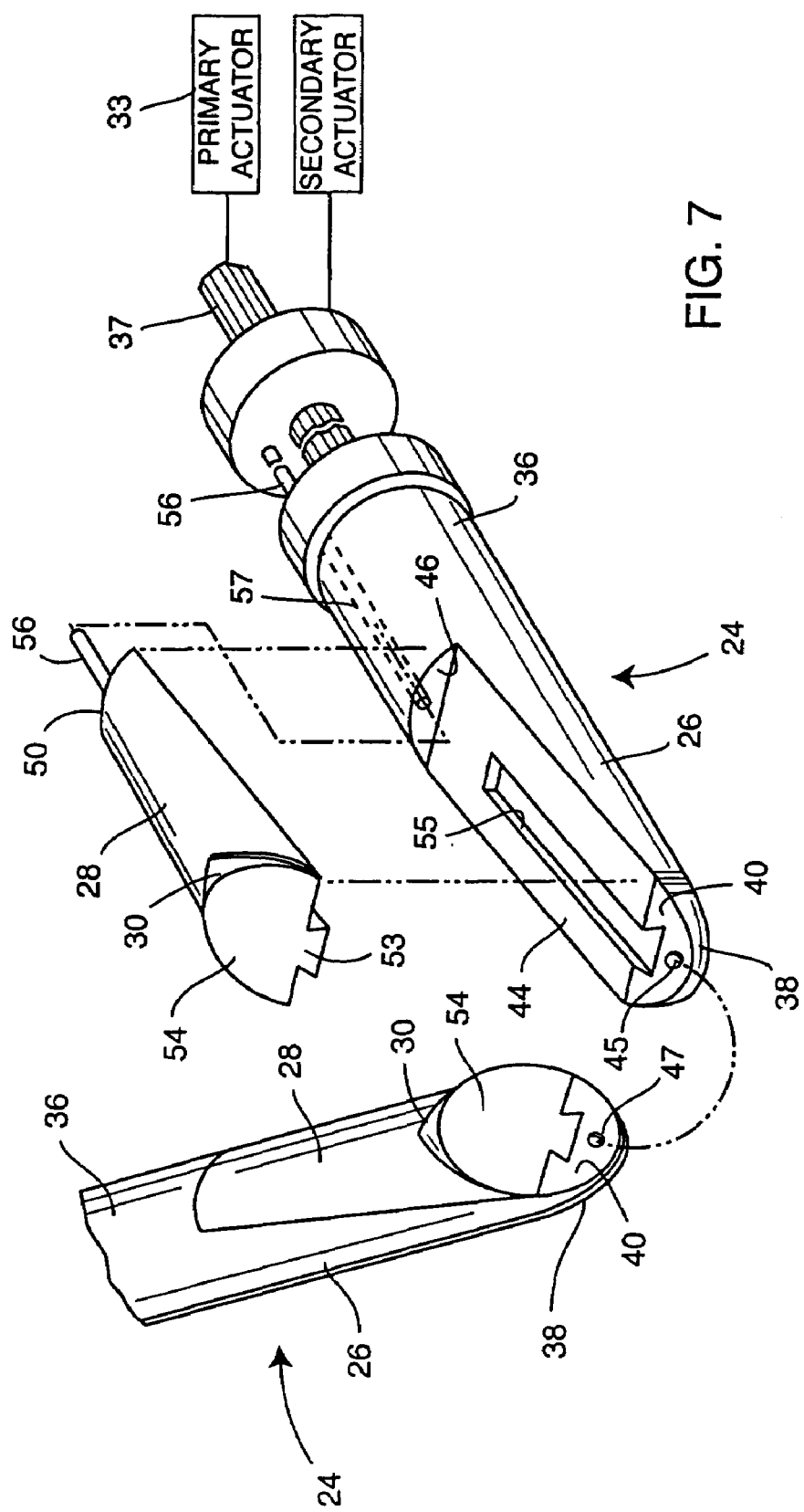
FIG. 7 is an exploded perspective view depicting assembly of the a core pin and a related inner slide segment forming each of the retractable core units.

Each core unit 24 comprises the outer core pin 26 having a part circular cross sectional shape (FIGS. 3, 7 and 10-11) for advancement into the mold cavity 22. This part circular core pin 26 protrudes from the end of a solid core pin base 36 of circular cross section adapted for suitable connection as by a control rod 37 to the associated primary actuator 33 for linearly advancing and retracting the core pin 26 relative to the mold cavity 22. The arcuate exterior surface of the part circular core pin 26 defines an outer portion of the flow path 12, and includes an inwardly curved and smoothly contoured nose end 38 shaped to form one-half of a smoothly radiused outside turn 42 (FIG. 2) to be formed along the flow path 12 within the molded part. The contoured nose end 38 merges with a distal end face 40 (shown best in FIGS. 7 and 11) comprising a planar abutment face extending angularly rearwardly and inwardly therefrom, set at an angle of about 450 to bisect the turn in the flow path 12, as previously described. From an inner margin of the distal end face 40, an elongated ramped track 44 (FIGS. 7 and 11) is formed on an inner surface of the outer core pin 26 to extend rearwardly and inwardly relative to a longitudinal centerline of the sliding core unit 24 and the associated flow path 12 to be formed, terminating generally at the associated end of the mold cavity 22 in a radially extending stop surface 46 located at a distal end of the core pin base 36. While the specific geometry of the ramped track 44 may vary, FIGS. 3-7 show the ramped track 44 extending generally from the distal end face 40 at a point disposed outboard of an axial centerline of the core unit 24, rearwardly and inwardly at an angle of about 15°-20° to a point disposed inboard of the axial centerline before terminating at the stop surface 46. In a fully advanced position as viewed in FIG. 3, the distal end faces 40 of the two core pins 26 are disposed in end-to-end abutting contact so that the outer core pins 26 of the two sliding core units continuously define the shape of the outer portion of the flow path 12, including the smoothly radiused outside turn 42. If desired, as shown in FIG. 7, one of the core pins 26 may include a short alignment tab 45 protruding from the distal end face 40 thereof, for mated and seated reception into a shallow detent 47 formed in the distal end face 40 of the other core pin 26, for interlocking engagement of the two core pins 26 in the fully advanced position (FIGS. 3 and 4).

The inner slide segment 28 of each retractable core unit 24 is slidably carried on the ramped track 44 of the associated outer core pin 26. As shown in FIGS. 3 and 7-9, each inner slide segment 28 also has a part circular cross sectional shape for nested and mating reception in a retracted position on the ramped track 44 with a proximal end 50 engaging the stop surface 46. In this position, the inner slide segment 28 cooperates with the associated outer core pin 26 to define a full circle cross section for the flow path 12 to be molded into the elbow fitting 10. More specifically, the inner slide segment 28 includes an angularly set outer slide surface 52 extending from the proximal end 50 to a distal end face 54 which is angularly set to define a planar abutment face to engage and contact the distal end face 54 of the inner slide segment 28 on the other sliding core unit 24, when the sliding core units 24 are fully advanced into the mold cavity. FIG. 3 shows the distal end faces 54 of the two inner slide segments 28 in end-to-end engagement, and disposed at the mid point of the flow path turn in a position substantially coplanar with the abutted distal end faces 40 of the outer core pins 26. An elongated depending key 53 such as a dovetail key (FIGS. 7-9) protrudes outwardly from the outer slide surface 52 of the inner slide segment 28 for longitudinal sliding reception within a slot 55 such as dovetail slot (FIGS. 7 and 11) formed in the ramped track 44 of the associated outer core pin 26. A control rod 56 is connected to the rear or proximal end 50 of the inner slide segment 28 and extends rearwardly therefrom through a guide port 57 formed in the core pin base 36 to the exterior of the mold cavity 22. This control rod 56 accommodates sliding displacement of the inner slide segment 28 along the ramped track 44 on the outer core pin 26, while preventing the inner slide segment 28 from sufficient advancing displacement to separate from the outer core pin 26.

In accordance with one primary aspect of the invention, each inner slide segment 28 additionally includes the curved inside edge or trigger-shaped portion 30 at a position adjacent the distal end face 54 thereof. This curved inside edge 30 defines a continuation of the flow path 12 of circular cross section, extending or wrapping part-way through the turn, and cooperates with the curved inside edge 30 of the other inner slide segment 28 to form the smoothly radiused inside turn 16. As a result, the curved inside edges 30 of the two inner slide segments 28 necessarily protrude inwardly beyond an innermost surface of the associated linear segment of the flow path 12 leading to the turn. Accordingly, the curved inside edge 30 of each inner slide segment 28 must be displaced outwardly toward a centerline of the associated sliding core unit and toward a centerline of the flow path 12 formed in the molded part, before the sliding core unit 24 can be retracted and withdrawn from the molded part.

FIG. 3 additionally shows a pair of insert sleeves 58 carried slidably about the two core units 24, respectively, for advancement a short distance into the opposite ends of the mold cavity 22. The illustrative insert sleeves 58 have a smooth-surfaced configuration to form short counterbores 59 (FIG. 2) in the opposite ends of the molded elbow fitting 10, wherein these counterbores 59 comprise slip-fit female connectors for connection by an adhesive or the like to the ends of the fluid-carrying pipes 14 (FIGS. 1 and 2), all in a manner well known to persons having ordinary skill in the art. Alternately, it will be recognized and understood that the insert sleeves 58 may be configured to form threaded female connectors for thread-in coupling with the associated pipes 14, or alternately adapted to form slip-fit male or threaded male connectors, or any combination thereof.

FIG. 4 shows the mold apparatus of FIG. 3, with plastic material injected through an illustrative sprue 60 to form the molded part. The outer core pin 26 of each core unit 24 can be retracted or withdrawn from the molded elbow fitting 10. FIG. 5 illustrates initial retraction or withdrawal of one of the outer core pins 26, by appropriate operation of the primary actuator 33, wherein such retraction is accompanied by relative advancement of the associated inner slide segment 28 downwardly and forwardly along the ramped track 44. In this regard, such advancement of the inner slide segment 28 can occur by positive advancement of the associated control rod 56 in response to operation of a secondary actuator 64 connected thereto. Alternately, such relative advancement can occur as a result of the curved inside edge 30 physically catching on the inside turn of the molded part to provide a sufficient resistance force preventing concurrent linear retraction of the inner slide segment 28. Instead, the inner slide segment 28 is forced to translate along the ramped track 44 relative to the retracting outer core pin 26, for outward positional shifting of the inner slide segment 28 sufficient for the inside curved edge 30 to clear the inside turn of the molded part. In either case, the control rod 56 couples the inner slide segment 28 to the associated core pin 26 is a manner preventing the inner slide segment from translating off the distal end of the core pin. As soon as the inner slide segment 28 is shifted outwardly a sufficient distance toward the centerline of the core unit 24 and the related flow path formed in the molded part, the entire core unit 24 can be retracted from the mold assembly without interference. FIG. 6 shows linear retraction of both core units 24, with the inner slide segments 28 of each sliding core unit advanced along the associated ramped tracks for shift outwardly relative to the inside turn 16 of the molded part to permit interference-free withdrawal of the core units 24 therefrom. The mold members 18, 20 can then be opened to release the finished molded plastic elbow fitting 10.

The resultant molded elbow fitting 10 is thus formed with the continuous flow path 12 having the smoothly radiused inside turn 16. During use, this flow path geometry achieves a substantial reduction in pressure drop through the elbow fitting, in comparison with a standard flow path geometry including a relatively sharp corner or edge at the inside turn. Moreover, by providing the smoothly contoured inside turn in lieu of a sharp-cornered inside turn, a stress concentration site whereat fatigue failure in response to on-off pressure cycling can otherwise occur is also eliminated from the molded part.

From the foregoing, it should be appreciated that the mold assembly and method of the present invention although illustrated and described in connection with the formation of a new and improved molded plastic elbow fitting 10, could also be utilized with the production of other molded plastic parts wherein an elbow-shaped flow path is desired. For example, a person skilled in the art would recognize that the mold assembly and method of the present invention could be readily used to produce the elbow-shaped flow-paths found in typical molded plastic valve bodies such as anti-siphon and fluid pressure and flow control irrigation valves. In such valves, it is common to use a 90° elbow-shaped inlet and/or outlet passageway through which the valve is connected to adjacent supply pipes, the elbow-shaped passageway typically having heretofore been formed using conventional intersecting cores similar to those described herein above in connection with the molding of prior art plastic elbow fittings. Through use of the mold assembly and method of the present invention, a valve body shaped according to the molded plastic part shown in FIGS. 1 and 2, or otherwise modified in geometry and/or adapted for assembly with other valve housing components (not shown), is provided with in internal flow path having elbow-shaped inlet and/or outlet passageways formed with a smoothly radiused inside turn surface geometry to provide reduced pressure losses and improved fatigue resistance.

A variety of further modifications and improvements in and to the improved molded plastic elbow and related method and apparatus for the production thereof will be apparent to those persons skilled in the art. In this regard, while the invention has been shown and described with respect to a single cavity mold apparatus, persons skilled in the art will understand and appreciate that a multiple cavity mold. assembly may be employed. Moreover, it will be appreciated that other types of devices may be formed with internal flow paths defined by smoothly radiused inside turns, the essential requirement being that the elbow passageway be accessible during the molding process from both ends. Accordingly, no limitation on the invention is intended by way of the foregoing description and accompanying drawings, except as set forth in the appended claims.

What is claimed is:

1. A method of making a molded plastic body wherein the body includes an internal flow path having a turn formed along the length thereof defined by a smoothly radiused inside turn surface, said method comprising the steps of:

forming a mold cavity having a shape conforming to the exterior geometry of a body to be molded;

advancing a pair of core units to protrude into the mold cavity in end-to-end abutting engagement with each other to cooperatively defined an internal flow path through the body to be molded with a turn formed along the length of the internal flow path;

each of the core units comprising an outer core pin defining an outer portion of the internal flow path and including a ramped track extending longitudinally and angularly inwardly from a distal end thereof, and an inner slide segment defining an inner portion of the internal flow path and being movably carried on the ramped track and further including a curved inner edge disposed generally at a distal end thereof to define a portion of a smoothly radiused inside turn surface of the internal flow path;

injecting plastic material into the mold cavity to form the body; and retracting each of the core units from the mold cavity, said retracting step comprising retracting the outer core pin to permit movement of the inner slide segment along the ramped track of said outer core pin to shift the inner slide segment in an outward direction relative to a centerline of the internal flow path sufficiently for interference-free withdrawal of the core unit from the mold cavity and the body molded therein.

\* \* \* \* \*